United States Patent [19]

Sperduti et al.

[11] Patent Number: 5,377,800
[45] Date of Patent: Jan. 3, 1995

[54] HYDRAULICALLY-ACTUATED SHIFT SYSTEM FOR A TRANSFER CASE

[75] Inventors: David Sperduti, Auburn; Randy W. Adler, Seneca Falls; Victor L. Brezee, Auburn, all of N.Y.

[73] Assignee: New Venture Gear, Inc., Troy, Mich.

[21] Appl. No.: 57,272

[22] Filed: May 4, 1993

[51] Int. Cl.6 .............. F16D 25/08; F16D 23/02
[52] U.S. Cl. ..................... 192/85 CA; 192/53 F
[58] Field of Search ............... 192/53 F, 85 C, 85 CA

[56] References Cited

U.S. PATENT DOCUMENTS

| | | | |
|---|---|---|---|
| 2,562,612 | 7/1951 | Halberg | 192/53 F |
| 4,293,061 | 10/1981 | Brown | 192/85 CA X |
| 4,770,280 | 9/1988 | Frost | 192/53 F |
| 4,776,444 | 10/1988 | Wörner et al. | 192/85 CA |
| 4,844,218 | 7/1989 | Genise | 74/339 X |
| 5,105,927 | 4/1992 | Frost | 192/53 F |
| 5,234,091 | 8/1993 | Kobayashi et al. | 192/85 CA |

FOREIGN PATENT DOCUMENTS 1594316  9/1990  U.S.S.R. .............. 192/85 C

Primary Examiner—Rodney H. Bonck
Attorney, Agent, or Firm—Harness, Dickey & Pierce

[57] ABSTRACT

The present invention provides a hydraulically-actuated shift system that is operable for shifting a mechanical shift apparatus of a power transfer device between first and second operative positions. The hydraulically-actuated shift system includes a hydraulic circuit for providing a source of hydraulic power, a hydraulic actuator for selectively moving a clutch sleeve of the mechanical shift mechanism between the first and second drive positions, and an electric control circuit for controlling selective actuation of the hydraulic actuator. The shift system is particularly well-suited for use with four-wheel drive transfer cases for permitting the vehicle operator to shift between two-wheel and four-wheel drive modes and or between various speed ranges.

7 Claims, 2 Drawing Sheets

HYDRAULICALLY-ACTUATED SHIFT SYSTEM FOR A TRANSFER CASE

BACKGROUND OF THE INVENTION

The present invention relates generally to shift systems for power transfer devices and, more particularly, to a hydraulically-actuated shift system for a part-time four-wheel drive transfer case.

With the advent of increased consumer popularity in four-wheel drive passenger cars and sport/utility vehicles, power transfer devices are more frequently being incorporated in vehicular driveline applications. As is known, part-time transfer cases are used in four-wheel drive vehicles for selectively directing power to the non-driven wheels upon shifting from the two-wheel drive mode to the four-wheel drive mode. More particularly, most conventional transfer cases use a transmission type synchronizer clutch arrangement incorporated with a shift fork mechanism to provide "shift-on-the-fly" two-wheel drive to four-wheel drive mode shifting. When shifting the transfer case between the two-wheel and four-wheel drive modes, selective movement of a shift lever by the vehicle operator causes corresponding movement of the sniff fork mechanism between positions defining the two-wheel and four-wheel modes. Alternatively, the shift fork mechanism may be remotely actuated, as in an electronically-controlled shift system equipped with an electric motor actuator arrangement. In either case, movement of the shift fork mechanism toward the four-wheel drive position acts to energize the synchronizer clutch apparatus for shifting a clutch sleeve into engagement with the external spline of a silent chain carrier. In this manner, the transfer case is "locked-up" in the four-wheel drive mode for delivering power to the vehicle's front and rear wheels.

A common problem associated with many conventional part-time transfer cases is that it is often difficult to shift into the four-wheel drive mode. In manually-actuated part-time transfer cases, the vehicle operator is required to exert a large input force on the shift lever to physically overcome the shift resistance associated with shifting into the four-wheel drive mode. Similarly, in electrically-actuated shift systems the electric motor must continue to provide the large input force during an extended shift period which, in some instances, may overload the electric motor. In other instances, the electric motor may generate an excessive amount of shifting force for causing the shifting process to be noticeably harsh and abrupt.

SUMMARY OF THE INVENTION

It is therefore an object of the present invention to overcome the disadvantages associated with conventional transfer cases by providing an improved shift mechanism which is adapted to smoothly advance the synchronizer clutch sleeve into complete lock-up with the chain carrier without experiencing any undesirable shift harshness or gear clash.

Accordingly, the present invention is primarily directed to a hydraulically-actuated shift system for a four-wheel drive transfer case. More particularly, the hydraulically-actuated shift system includes a hydraulic circuit for providing a source of hydraulic power, a hydraulic actuator for selectively moving the clutch sleeve of a mechanical shift mechanism between the two-wheel and four-wheel drive positions, and an electric control circuit for controlling selective actuation of the hydraulic actuator.

BRIEF DESCRIPTION OF THE DRAWINGS

Further objects, features and advantages of the present invention will become apparent from the following description and accompanying drawings in which.

DETAILED DESCRIPTION OF THE INVENTION

Figure 1:
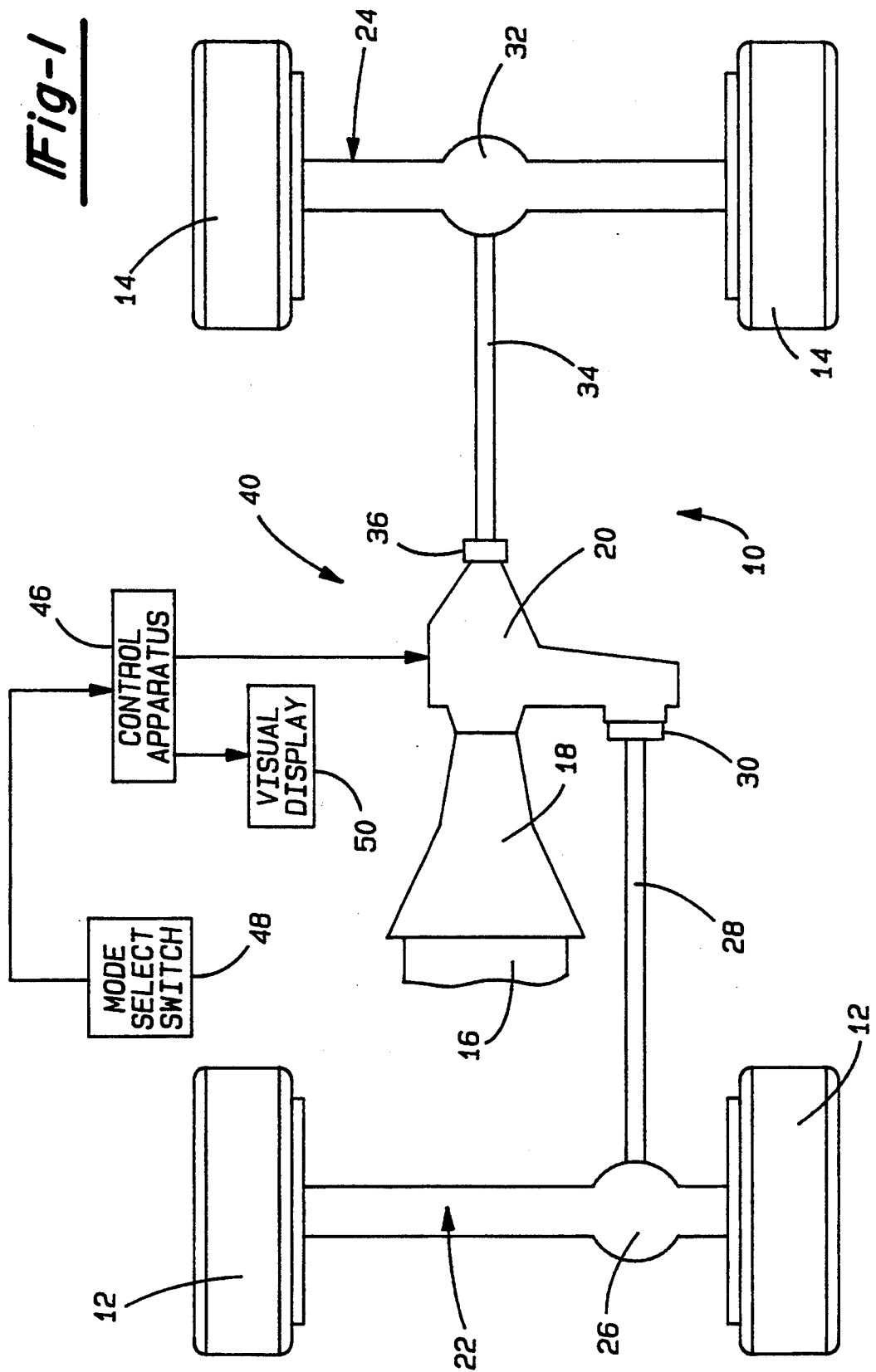
FIG. 1 is a schematic representation of a four-wheel drive motor vehicle equipped with an exemplary part-time transfer case having the hydraulically-actuated shift system of the present invention incorporated therein.

Referring to FIG. 1, a four-wheel drive vehicle of a type suited for use with the present invention is indicated generally by 10. Vehicle 10 has a pair of front wheels 12 and a pair of rear wheels 14 drivable from a source of power, such as an engine 16, through a transmission 18 which may be of either the manual or automatic type.

In the embodiment shown, vehicle 10 is a rear wheel drive vehicle which incorporates a power transfer means, such as a transfer case 20, for receiving drive torque from transmission 18 for normally driving rear wheels 14 in a two-wheel drive mode of operation. Transfer case 20 is also operable for selectively transferring drive torque to front wheels 12 for defining a four-wheel drive mode of operation. Front and rear wheels 12 and 14, respectively, are connected at opposite ends of front and rear axle assemblies 22 and 24, respectively. Front axle assembly 22 is part of a front drive mechanism which also includes a front differential 26 coupled to be driven by front prop shaft 28 when transfer case 20 is operating in the four-wheel drive mode. Front prop shaft 28 is connected at its opposite end to a front output shaft 30 of transfer case 20. Similarly, rear axle assembly 24 is part of a rear drive mechanism which includes a rear differential 32 coupled in driven relationship to rear prop shaft 34 for driving rear wheels 14. As seen, rear prop shaft 34 is connected at its opposite end to a rear output shaft 36 of transfer case 20. A transmission output shaft (not shown) couples transmission 18 to an input shaft (not shown) of transfer case 20 for supplying power thereto. As is known, the input shaft may be coupled directly to rear output shaft 36 or selectively engageable therewith as in transfer cases equipped with a shiftable speed reduction unit.

In accordance with the teachings of the present invention, a hydraulically-actuated shift system 40 is provided for shifting transfer case 20 between its two-wheel and four-wheel drive modes. In general, shift system 40 is operable for selectively controlling the communication of pressurized fluid to a hydraulic actuator 42 which, in turn, is operable for actuating a mechanical shift mechanism 44. As is schematically shown in FIG. 1, hydraulically-actuated shift system 40 includes a control apparatus 46 for controlling actuation of hydraulic actuator 42 in response to the specific drive mode selected by the vehicle operator, as signalled by a mode select switch 48. If hydraulically-actuated shift system 40 is integrated into a manually-operable transfer case, mode switch 48 could be any suitable switch or sensor device capable of generating a signal indicative of movement by the vehicle operator of the shift lever into one of the positions corresponding to the selected one of the two-wheel or four-wheel drive modes. Alternatively, in remotely-operable transfer cases, mode switch 48 could be any suitable push-button or toggle type switch that is located for easy manipulation by the vehicle operator. Control apparatus 46 is further operable for illuminating a visual display 50 within the passenger compartment to provide the vehicle operator with a visual indication of the operative drive mode of transfer case 20.

Figure 2:
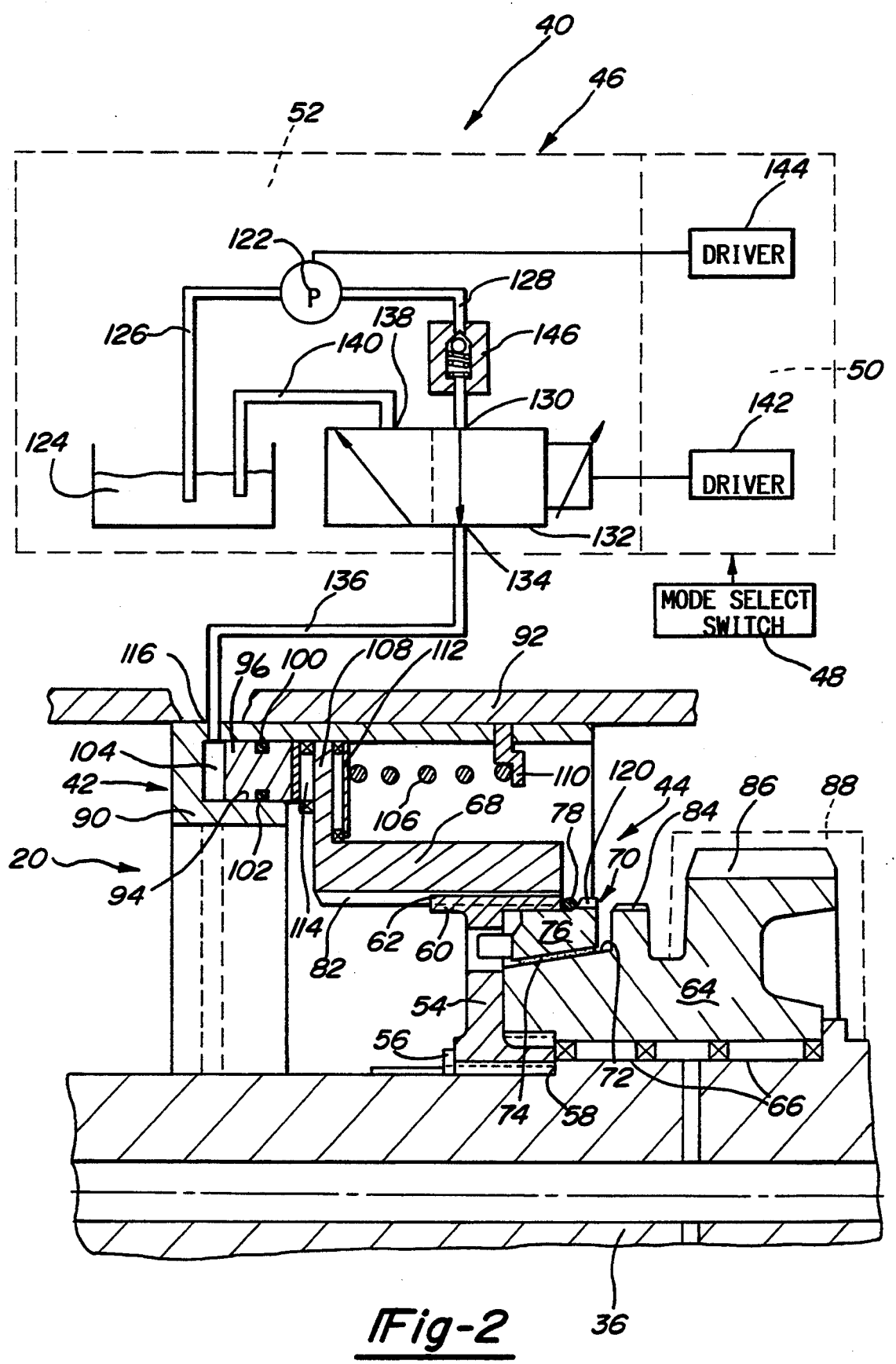
FIG. 2 is a partial sectional view of the transfer case shown in FIG. 1 and which diagrammatically illustrates the control system for the hydraulically-actuated shift system.

Referring now to FIG. 2, there is shown a portion of part-time four-wheel drive transfer case 20 which is pertinent to an understanding of hydraulically-actuated shift system 40 of the present invention. An exemplary part-time transfer case which, with the exception of its shift fork mechanism, could be used with the present invention is shown and described in detail in U.S. Pat. No. 4,770,280 to Frost which is commonly owned by the assignee of the present invention, the disclosure of which is expressly incorporated by reference herein. It is to be understood, however, that most conventional part-time transfer cases could be equipped with shift system 40 without departing from the scope of the present invention.

Control apparatus 46 is illustrated in schematic form to include an electrical control circuit 50 and a hydraulic circuit 52 for selectively actuating hydraulic actuator 42. It is to be understood that each circuit could be located internally to, or remote from, transfer case 20 as required by each particular vehicular application. In the specific embodiment shown, shift mechanism 44 is associated with an intermediate section of rear output shaft 36 and includes a hub member 54 splined for rotation with rear output shaft 36 and which is retained thereon between a snap ring 56 and a radial stop shoulder 58. Hub member 54 has an outer cylindrical rim portion 60 having external spline teeth 62 formed thereon. In addition, a chain carrier 64 is rotatably journalled by suitable roller bearings 66 on rear output shaft 36 and can be selectively coupled for rotation with hub member 54, and, in turn, rear output shaft 36 by engagement with an axially movable clutch sleeve 68.

To provide means for shifting transfer case 20 "on-the-fly" into the four-wheel drive mode, a synchronizer apparatus 70 is used for causing speed synchronization between rear output shaft 36 and chain carrier 64 prior to permitting to clutch sleeve 68 to enter into lock-up engagement with chain carrier 64. In general, synchronizer apparatus 70 is shown as a "strutless" type single cone servo-action synchronizer similar to that described in U.S. Pat. No. 5,105,927 to Frost, which is commonly owned by the assignee of the instant application, the disclosure of which is also expressly incorporated by reference herein. Another example of a suitable synchronizing apparatus, commonly referred to as a "strut" type synchronizer, is shown in the above-noted U.S. Pat. No. 4,770,280 to Frost. However, it will be understood that virtually any type of transmission synchronizer can be used with the present invention.

Synchronizer 70 is shown as having a single cone surface 72 and a single corresponding friction surface 74. More particularly, cone surface 72 is illustrated as being formed on an exterior surface of chain carrier 64 with friction surface 74 being formed on an interior surface of a blocker ring 76. Friction surface 74 is adapted to frictionally engage cone surface 72 upon energization of synchronizer 70. It will be noted that in the disclosed embodiment, friction surface 74 is in the form of a friction pad or lining bonded or cemented to the interior conical surfaces of blocker ring 76 for providing effective frictional engagement. In addition, synchronizer 70 is shown to include a thrust mechanism for causing energization thereof. The thrust mechanism is an annular spring 78 mounted on blocker ring 76. Annular spring 78 is formed with a predetermined internal diameter such that it is slidably received on an exterior surface of blocker ring 76 in a snug press-fit manner.

Shiftable clutch sleeve 68 is shown in a first position disengaged from chain carrier 64 for establishing the two-wheel drive mode. Clutch sleeve 68 is formed with internal spline teeth 82 which are in constant axial sliding engagement with external spline teeth 62 formed on cylindrical rim portion 60 of hub member 54. Thus, clutch sleeve 68 may be axially shifted from the first position toward a second position for causing internal spline teeth 82 to drivingly engage external spline teeth 84 on chain carrier 64, whereby the four-wheel drive mode is established. Chain carrier 64 includes a drive sprocket 86 which drivingly engages a chain, shown in dash lines at 88, which is coupled to a lower driven sprocket (not shown). In turn, the driven sprocket is coupled to front output shaft 30. In conventional transfer cases, front output shaft 30 is mounted for rotation within the transfer case and is suitably connected to front prop shaft 28 in a known manner.

With continued reference now to FIG. 2, hydraulically actuated shift system 40 will now be described in greater detail. In general, hydraulic actuator 42 is adapted to axially shift clutch sleeve 68 between the first (i.e., two-wheel drive) position and the second (i.e., four-wheel drive) position following complete synchronization between rear output shaft 36 and chain carrier 64. Hydraulic actuator 42 is shown to include an annular housing 90 that is fixedly retained to an inner wall portion 92 of transfer case 20. Annular housing 90 includes an annular ring-like chamber 94 within which a ring-like piston 96 is disposed for axial movement. More particularly, the outer and inner periphery of a ring-like piston 96 are sealed via suitable o-ring seals 100 and 102, respectively, in a liquid-tight manner to define a working chamber 104 on one side of piston 96. A spring member 106 is disposed under compression on the opposite side of piston 96 between an upstanding annular flange portion 108 of clutch sleeve 68 and a spring retainer 110 fixed to housing 90 for normally biasing piston 96 toward working chamber 104. Thus, spring member 106 is adapted to normally bias clutch sleeve 68 toward the two-wheel drive position shown in opposition to the biasing force exerted on piston 96 by the fluid pressure acting within working chamber 104. Since piston 96 and spring member 106 are non-rotatably retained within housing 90, and yet are adapted to act on rotatably driven clutch sleeve 68, a pair of thrust bearing assemblies 112 and 114 are interposed therebetween to permit rotational and axial movement of clutch sleeve 68.

Working chamber 104 is in fluid communication with a port 116 formed in housing 90 such that when a high pressure fluid (i.e., oil) is supplied to working chamber 104, piston 96 is forcibly urged to move to the right, as viewed in FIG. 2, in opposition to the biasing force of spring member 106 for axially shifting clutch sleeve 68 from the two-wheel drive position into the four-wheel drive position. As will be appreciated, such movement of piston 96 causes clutch sleeve 68 to initially engage annular energization spring 78 on blocker ring 76 for causing speed synchronization in a known manner. When the speed synchronization process is complete, clutch sleeve 68, under the continued pressure exerted by piston 96, moves past blocker ring external teeth 120 until its internal splines 82 engage external splines 84 of chain carrier 64.

In operation, control apparatus 46 is adapted to control the supply of pressurized fluid to working chamber 104 of hydraulic actuator 42. More specifically, an electrical signal from mode select switch 48 is inputted into electrical control circuit 50 of control apparatus 46. As noted, control apparatus 46 also includes hydraulic circuit 52 for supplying the pressurized fluid to working chamber 104 of hydraulic actuator 42. In the embodiment shown, hydraulic circuit 52 includes a pump 122 for pressurizing low pressure fluid sucked from reservoir 124 via an inlet conduit 126 and provides high pressure fluid via outlet conduit 128 to an inlet port 130 of a suitable electrically-actuated flow control valve, such as solenoid valve 132. Solenoid valve 132 is operable in a first "state" for permitting inlet port 130 to communicate with an outlet port 134 for delivering pressurized fluid to working chamber 104 via a supply conduit 136. In its second "state", solenoid valve 132 is operable for interrupting such flow and providing fluid communication between outlet port 134 and a discharge port 138 for venting fluid in supply conduit 136 to reservoir 124 via a return conduit 140. The operational "state" of solenoid valve 132 is electrically controlled by a first driver portion 142 of electric control circuit 50. Similarly, selective actuation of pump 122 is controlled by a second driven portion 144 of electric control circuit 50.

When the vehicle operator attempts to shift mechanical shift mechanism 44 from the two-wheel drive mode into the four-wheel drive mode through actuation of a suitable control device, as signalled by mode switch 48, hydraulic pump 122 is energized by second driver 144 to deliver pressurized hydraulic fluid to inlet port 130 of solenoid valve 132. Concurrently, first driver 142 either maintains or shifts solenoid valve 132 into its first operating "state" to permit the pressurized fluid to communicate with working chamber 104 via outlet port 134 and supply conduit 136. Preferably, pump 122 is energized until a predetermined fluid pressure is established. Thereafter. pump 122 is deactivated. However, the fluid pressure within working chamber 104 is maintained by a check valve 146 such that the force acting on piston 96 causes smooth movement of clutch sleeve 68 through synchronizer 70 and into complete lock-up with chain carrier 64. During four-wheel drive operation of vehicle 10, the fluid pressure in working chamber 104 is maintained by maintaining solenoid valve 132 in its first operating "state" to forcibly retain clutch sleeve 68 in the lock-up four-wheel drive position.

When the vehicle operator desires to shift transfer case 20 into the two-wheel drive mode, as again indicated by a signal generated by mode select switch 48, solenoid valve 132 is shifted into its second operating "state" by first driver 142 for closing communication between outlet conduit 128 and supply conduit 136, and opening fluid communication between supply conduit 136 and return conduit 140. As such, the fluid pressure in working chamber 104 is relieved upon the fluid being vented via return conduit 140 to reservoir 124. Concurrently, the biasing force exerted by spring member 106 acts in opposition to the reduced fluid pressure in working chamber 104 for moving clutch sleeve 68 and piston 96 to the left (FIG. 2), thereby returning clutch sleeve 68 to its two-wheel drive position. While a specific configuration for hydraulic circuit 52 and electrical control circuit 50 have been disclosed, it will be appreciated that any suitable control arrangement is within the scope of the present invention. Furthermore, it is also contemplated that a similar hydraulically-actuated shift system could be readily employed for shifting a speed reduction unit between the various speed ranges in transfer cases so equipped.

A specific embodiment of the invention has been shown and described in detail to illustrate the principles of the present invention. It will be understood, however, that the invention may be embodied in other forms without departing from such principles and the fair scope of the present invention.

What is claimed is:

1. A transfer case for a motor vehicle having an engine and first and second sets of wheels, comprising:
   a first output shaft for transmitting drive torque from the engine to the first set of wheels for normally establishing a two-wheel drive mode;
   a second output shaft for selectively transmitting drive torque to the second set of wheels for establishing a four-wheel drive mode;
   a shift mechanism having a clutch sleeve fixed for rotation with said first output shaft and supported for movement thereon between a first position uncoupled from said second output shaft for establishing said two-wheel drive mode, and a second position coupling said second output shaft for rotation with said first output shaft to establish said four-wheel drive mode;
   a hydraulic actuator acting on said clutch sleeve;
   a source of pressurized fluid in communication with said hydraulic actuator;
   a mode select mechanism for permitting a vehicle operator to select one of said two-wheel drive and four-wheel drive modes and generate an input signal indicative thereof; and
   control means for controlling the flow of said pressurized fluid between said hydraulic actuator and said fluid source for selectively moving said clutch sleeve between said first and second positions in response to said input signal.

2. The transfer case of claim 1 wherein said shift mechanism includes a synchronizer apparatus for causing speed synchronization between said first and second output shafts in response to movement of said clutch sleeve toward said second position.

3. The transfer case of claim 2 further comprising a biasing member for normally biasing said clutch sleeve toward said first position.

4. The transfer case of claim 1 wherein said control means includes an electrical control circuit for receiving said input signal and controlling the flow of pressured fluid between said hydraulic actuator and said fluid source in response thereto, whereby said clutch sleeve is moved to the one of said first and second positions indicated by said input signal.

5. The transfer case of claim 4 further comprising flow control means in fluid communication with said fluid source and said hydraulic actuator and which is operable for controlling the flow of pressurized fluid therebetween in response to said input signal.

6. The transfer case of claim 5 wherein said shift mechanism includes a synchronizer apparatus for causing speed synchronization between said first and second output shafts in response to movement of said clutch sleeve toward said second position.

7. The transfer case of claim 6 further comprising a biasing member for normally biasing said clutch sleeve toward said first position.

* * * * *